US006258337B1

(12) United States Patent
Sonobe et al.

(10) Patent No.: US 6,258,337 B1
(45) Date of Patent: Jul. 10, 2001

(54) CARBONACEOUS MATERIAL FOR ELECTRIC DOUBLE LAYER CAPACITOR AND PROCESS FOR PRODUCTION THEREOF

(75) Inventors: Naohiro Sonobe; Aisaku Nagai; Tomoyuki Aita, all of Iwaki; Minoru Noguchi, Wako; Manabu Iwaida, Wako; Eisuke Komazawa, Wako, all of (JP)

(73) Assignees: Kureha Kagaku Kogyo Kabushiki Kaisha; Honda Giken Kogyo Kabushiki Kaisha, both of Tokyo (JP)

( * ) Notice: Subject to any disclaimer, the term of this patent is extended or adjusted under 35 U.S.C. 154(b) by 0 days.

(21) Appl. No.: 09/229,763

(22) Filed: Jan. 14, 1999

(30) Foreign Application Priority Data

Jan. 20, 1998 (JP) ..................................... 73-21568

(51) Int. Cl.$^7$ .................................................. C01B 31/02
(52) U.S. Cl. ...................................... 423/445 R; 423/448
(58) Field of Search ................................ 423/445 R, 448; 502/416

(56) References Cited

U.S. PATENT DOCUMENTS 5,653,951 * 8/1997 Rodriquez ............................ 423/439

* cited by examiner

*Primary Examiner*—Stuart L. Hendrickson
(74) *Attorney, Agent, or Firm*—Wenderoth, Lind & Ponack, L.L.P.

(57) ABSTRACT

A carbonaceous electrode material for electric double layer capacitors having a large capacitor per volume, a low resistivity and a large bulk density, is provided as a carbonaceous material having a specific surface area of 800–2000 m$^2$/g as measured by the nitrogen adsorption BET method, and an average layer-plane spacing of at most 0.36 nm as measured by the X-ray diffraction method. The carbonaceous material is preferably produced by carbonizing and activating a carbon precursor of pitch origin in an oxidizing atmosphere.

4 Claims, 1 Drawing Sheet

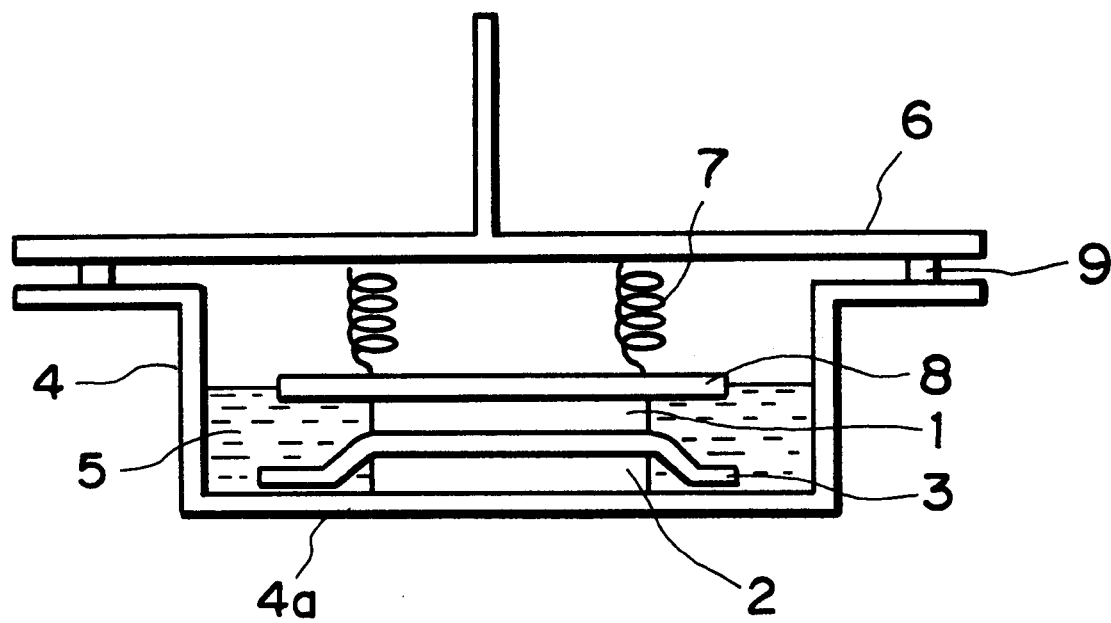

CARBONACEOUS MATERIAL FOR ELECTRIC DOUBLE LAYER CAPACITOR AND PROCESS FOR PRODUCTION THEREOF

FIELD OF THE INVENTION AND RELATED ART

The present invention relates to a carbonaceous material for electric double layer capacitors, more particularly a carbonaceous material suitable as a capacitor electrode material having a large capacity, a low electric resistivity and a large bulk density, and a process for production thereof.

In electronic apparatus equipped with IC memories, such as micro-computers and personal computers, back-up power supplies are extensively used for obviating mal-function of or loss of recorded data from such electronic apparatus due to momentary power interruption or voltage drop. As such back-up power supplies, Ni—Cd batteries and lithium batteries have been used hitherto, but in recent years, an electric double layer capacitor is becoming frequently used because of its excellent instantaneous charge/discharge characteristics and little liability of performance lowering during repetitive use. The above-mentioned type of electronic apparatus is required to reduce its weight and size and exhibit better reliability particularly in recent years, and an electric double layer capacitor mounted therein is expected to have a larger energy density so as to be adapted to such reduction in weight and size. Further, an electric double layer capacitor is expected to be used as a power source for electric vehicles because of its instantaneous charge/discharge characteristics, and also for that use, is required to have a further increased energy density.

An electric double layer capacitor is a device formed by immersing a pair of solid electrodes in an electrolytic solution containing electrolyte ions and operated on a principle that when a DC voltage is applied between the electrodes, anions in the solution are attracted to a positively polarized electrode and cations in the solution are attracted to a negatively polarized electrode respectively electrostatically to form a spatial charge layer called an electric double layer at a boundary of each electrode with the electrolytic solution so that an electric energy of the charges accumulated in the electric double layers is utilized. Accordingly, in order to provide an electric double layer capacitor with an increased capacity, it is indispensable to develop a material capable of forming a totally larger area of electric double layers. A polarizable electrode proposed and used heretofore is a sheet principally comprising a carbonaceous material in a state of activated carbon. This is because activated carbon has a large specific surface area and chemical stability which are properties suitable for capacitor electrode material. For capacitors, there have been proposed, e.g., powdery activated carbon having a specific surface area of 1800–3500 m$^2$/g, an average pore diameter of 5–15 Å, and a ratio of volume of pores having inner diameters of at least 20 Å to a total volume of pores of 20–40% (e.g., Japanese Laid-Open Patent Appln. (JP-A) 63-187614), and fibrous activated carbon obtained by carbonizing and activating phenolic resin fiber (e.g., Japanese Patent Publication (examined) (JP-B) 60-15138). However, an electric double layer capacitor obtained by using activated carbon powder having a large specific surface area exhibits a large capacitance per unit weight of the activated carbon but does not necessarily exhibit a large capacitance per unit volume of the activated carbon because it provides an electrode of a small bulk density. Such powdery activated carbon may be formed into a sheet-form electrode by using an appropriate binder, but in this case, a quick charge/discharge characteristic of the electric double layer capacitor is liable to be lost. On the other hand, a woven cloth of fibrous activated carbon prepared from phenolic resin fiber provides an advantageous feature of lower resistivity because it uses no binder than a sheet electrode formed from powdery activated carbon together with a binder. In this case, however, the resultant electrode has a small bulk density so that it has a large capacitance per weight but has a small capacitance per volume.

SUMMARY OF THE INVENTION

Accordingly, an object of the present invention is to provide a carbonaceous material suitable as an electrode material for electric double layer capacitors having a large capacitance per volume, a low electrical resistivity and a large bulk density.

Another object of the present invention is to provide a process for producing such a carbonaceous material.

As a result of our study on electrode materials for high-performance electric double layer capacitors for achieving the above-mentioned objects, it has been found that a carbonaceous material obtained by subjecting a certain carbon precursor to an appropriate activation treatment has appropriate level of specific surface area and layer structure and, because of these features, provides an electrode material having a large capacitance, a large bulk density and a low resistivity, thus arriving at the present invention.

According to the present invention, there is provided a carbonaceous material for electric double layer capacitors, having a specific surface area of 800–2000 m$^2$/g as measured by the nitrogen adsorption BET method, and an average layer-plane spacing of at most 0.36 nm as measured by the X-ray diffraction method.

According to another aspect of the present invention, there is provided a process for producing the above-mentioned carbonaceous material for electric double layer capacitors, comprising: activating a carbon precursor of pitch origin in an oxidizing gas atmosphere at a temperature of 700–1500° C. Preferably, the carbon precursor of pitch origin is produced through steps of: mixing pitch with an additive comprising an aromatic compound having two to three aromatic rings and a boiling point of at least 200° C. to form a shaped pitch product; extracting the additive from the shaped pitch product with a solvent showing a lower dissolving power to the pitch and a higher dissolving power to the additive, thereby to leave a porous pitch product; and oxidizing the porous pitch product to form a thermally infusible porous carbon precursor to be subjected to the activation.

Compared with conventional activated carbon obtained by using a phenolic resin as the starting material, for example, the carbonaceous material according to the present invention has a relatively small specific surface area (a relatively low degree of activation) and a relatively small layer spacing ($d_{002}$) (a relatively high degree of graphitization), and correspondingly has a relatively low resistivity, thus effectively functioning as an electric double layer capacitor electrode material having a relatively high bulk density. This is presumably because the carbon precursor before the activation is provided with a diversity of microtexture due to a diversity of components contained in the starting pitch and a nongraphitizable texture portion is preferentially dissipated by oxidation in the carbonization and activation step to result in a graphite-rich microtexture. In contrast thereto, in the case of carbonizing and activating a phenolic resin, it is assumed that a relatively uniform carbon precursor is produced, and on further progress of the activation, the effect of preferential dissipation of non-graphitizable portion to leave a graphite-rich microtexture cannot be substantially expected.

Incidentally, while the mechanism has not been fully clarified, in the infusibilized porous carbon precursor of pitch origin produced in the above-mentioned preferable process, it is assumed that the diversity of components in the starting pitch is enhanced and a layer of non-graphitizable carbon precursor is preferentially present at the pore surfaces, so that the layer of nongraphitizable carbon precursor is preferentially dissipated in the carbonization and activation stage, to result in a graphite-rich micro-texture even at a relatively low level of activation treatment.

The thus-formed carbonaceous material according to the present invention retains numerous fine pores and therefor can provide many electric double layers at boundaries with the electrolytic solution.

These and other objects, features and advantages of the present invention will become more apparent upon a consideration of the following description of the preferred embodiments of the present invention taken in conjunction with the accompanying drawing.

BRIEF DESCRIPTION OF THE DRAWING

The sole FIGURE is a sectional illustration of a test cell for evaluating capacitor performance as an embodiment of electric double layer capacitor.

DETAILED DESCRIPTION OF THE INVENTION

The carbonaceous material according to the present invention is characterized by having a specific surface area as measured by the nitrogen adsorption BET method (hereinafter sometimes, simply referred to as "SSA") of 800–2000 m$^2$/g, and an average layer-plane spacing (hereinafter sometimes referred to as "$d_{002}$") of at most 0.36 nm.

A carbonaceous material having SSA below 800$^2$/g is liable to result in a capacitor electrode having a small capacitance per unit weight, and a carbonaceous material having SSA exceeding 2000 m$^2$/g is liable to provide an electrode having a low bulk density and therefore a small capacitance per unit volume while it may have a large capacitance per unit weight. SSA is 800–2000 m$^2$/g, preferably 1000–1900 m$^2$/g, further preferably at least 1050 m$^2$/g and below 1800 m$^2$/g.

A carbonaceous material having $d_{002}$ larger than 0.36 nm is liable to result in an electrode having an increased resistance. "$d_{002}$" is at most 0.36 nm, preferably at most 0.35 nm. For reference, "$d_{002}$" of graphite is 0.335 nm.

The carbonaceous material according to the present invention is generally provided for use in a state of powder. In the case of powder, too large particles are liable to result in an electrode having a low capacitance per unit volume because of a lowering in particle packing rate. The carbonaceous material may preferably have an average particle size (which means a number-average particle diameter herein unless otherwise noted specifically) of 5–100 μm, more preferably 10–50 μm.

As mentioned above, the carbonaceous material according to the present invention may preferably be produced through a specific process as described below.

An additive comprising an aromatic compound having two to three aromatic rings and a boiling point of at least 200° C., or a mixture thereof, is added to a pitch material, such as petroleum pitch or coal pitch, to form a shaped pitch product. Then, the additive is extracted from the shaped pitch product with a solvent showing a lower dissolving power to the pitch material and a higher dissolving power to the pitch material to obtain a porous pitch product. The porous pitch product is then oxidized to provide a thermally infusible porous pitch product, which is then subjected to an activation treatment to obtain the objective carbonaceous material in the form of activated carbon.

The above-mentioned aromatic additive is added for the purpose of converting the shaped pitch product into a porous material through removal by extraction of the additive so as to facilitate the micro-texture control and activation of the resultant carbonaceous material in the subsequent steps. Such an additive may more specifically be selected as a single species or a mixture of two or more species selected from, e.g., naphthalene, methylnaphthalene, phenylnaphthalene, benzylnaphthalene, methylanthracene, phenanthrene, and biphenyl. The additive may preferably be added in a proportion of 10–50 wt. parts per 100 wt. parts of the pitch.

The mixing of the pitch and the additive may suitably be performed in a molten state under heating in order to achieve uniform mixing. The resultant mixture of the pitch and additive may preferably be shaped into particles of at most 1 mm in diameter so as to facilitate the extraction of the additive from the mixture. The shaping may be performed in a molten state or by pulverization of the mixture after cooling.

Suitable examples of the solvent for removal by extraction of the additive from the mixture of the pitch and the additive may include: aliphatic hydrocarbons, such as butane, pentane, hexane and heptane; mixtures principally comprising aliphatic hydrocarbons, such as naphtha and kerosene; and aliphatic alcohols, such as methanol, ethanol, propanol and butanol.

By extracting the additive from the shaped mixture product with such a solvent, it is possible to remove the additive from the shaped product while retaining the shape of the product. At this time, it is assumed that pores are formed at sites from which the additive is removed, thereby providing a uniformly porous pitch product.

The thus-obtained porous pitch product is then subjected to an infusibilization treatment, i.e., oxidation using an oxidizing agent preferably at a temperature of from room temperature to 400° C. Examples of the oxidizing agent may include: oxidizing gases, such as $O_2$, $O_3$, $SO_3$, $NO_2$, $Cl_2$, mixture gases formed by these gases diluted with, e.g., air or nitrogen, and air; and oxidizing liquids, such as sulfuric acid, phosphoric acid, nitric acid, chromatic acid aqueous solution, permanganic acid aqueous solution, and hydrogen peroxide aqueous solution.

The thus-formed infusibilized porous pitch product is subjected to an activation treatment in an atmosphere of an oxidizing gas, such as $H_2O$, $O_2$, $Cl_2$ or $CO_2$, at a temperature of 300–1500° C., to provide the carbonaceous material according to the present invention.

More specifically, the activation treatment may be performed by using an apparatus, such as a rotary kiln, a fluidized bed apparatus, or a moving bed apparatus, wherein the infusibilized porous pitch product is contacted with the above-mentioned oxidizing gas alone or in mixture with an inert gas at a gradually increasing temperature for heat treatment.

An example of using $H_2O$ as an oxidizing gas in a fluidized bed is now explained. A vertically installed reaction tube equipped with a perforated plate is charged with a porous infusibilized pitch, and a reaction gas mixture of $H_2O$ with an inert gas, such as nitrogen, argon or helium, containing 20–90 mol. % of $H_2O$ is flowed at a temperature on the order of 200° C. into the reaction tube from its bottom, thereby forming a fluidized bed. Then, while flowing the reaction gas, the fluidized bed temperature is raised to a prescribed temperature generally set within a range of ca. 700–1500° C. at a rate of ca. 10–400° C./hour and retained, as desired, at that temperature for prescribed hours. The retained temperature (activation temperature) may preferably be in a range of 800–1200° C.

The carbonaceous material according to the present invention may be formulated as a carbonaceous material of a desired particle size by pulverizing the porous infusible pitch product before the activation or the carbonaceous material after the activation treatment.

For providing an electric double layer capacitor by using the carbonaceous material according to the present invention, a composite electrode material may be formulated by mixing the carbonaceous material in an average particle size of 5–100 µm with a binder of, e.g., polytetrafluoroethylene or polyvinylidene fluoride optionally together with an electroconductive material, such as carbon black, and an, e.g., 10–200 µm-thick layer of such a composite electrode material may be applied onto an electroconductive substrate of a circular or rectangular metal sheet, etc. to form a polarizable electrode. The binder may preferably be used in an amount of 1–20 wt. % of the powdery carbonaceous material. If the amount of the binder is excessive, the resultant electrode is caused to have a large internal resistance, and if it is too small, the bonding becomes insufficient between the individual carbonaceous material particles and between the carbonaceous material particles and the electroconductive substrate. The electroconductive material may preferably be added in an amount of 3–20 wt. %. Further, it is also possible to form, e.g., a circular or rectangular sheet of polarizable carbonaceous electrode material, e.g., by compression molding, and electrically connect an electroconductive substrate with the sheet of polarizable carbonaceous electrode material to provide a polarizable electrode. In order to achieve the electrical connection, it is possible, for example, to form the electroconductive substrate by melt-spraying of a metal, such as aluminum onto the sheet of polarizable carbonaceous electrode material or to pressure bond a foil or net of a metal, such as aluminum onto the sheet of polarizing carbonaceous electrode material.

In the case of using a thin carbonaceous material layer of, e.g., in a thickness of 10–200 µm on an electroconductive substrate of a metal, etc., it is possible to suitably adopt a method of dissolving a binder, such as polyvinylidene fluoride, in a solvent capable of dissolving the binder, such as N-methyl-2-pyrrolidone, for example, for a binder of polyvinylidene fluoride, and adding the carbonaceous material powder and optionally an electroconductive material into the resultant binder solution to form a paste, followed by uniform application and drying of the paste on the electroconductive substrate. In this case, it is also possible to press the resultant carbonaceous material layer at room temperature or an elevated temperature after the drying, so as to provide the carbonaceous material layer with an increased bulk density. In the case of forming a disk- or thick sheet-form carbonaceous material layer (composite polarizable electrode layer), it is preferred to adopt a method of using, e.g., polytetrafluoroethylene, as a binder, blending or kneading the binder, the carbonaceous material and optionally the electroconductive material at room temperature or kneading the blend at an elevated temperature, and subjecting the resultant blend or kneaded product to compression molding at room temperature or an elevated temperature.

A unit cell of electric double layer capacitor may be formed by immersing a pair of polarizable electrodes prepared in the above-described manner and disposed opposite to each other optionally with a liquid-permeable separator therebetween in an electrolytic solution. In this instance, the pair of polarizable electrodes may be identical or different from each other. An electric double layer capacitor may be constituted by the above-mentioned unit cell alone or a plurality of the unit cells connected in series and/or in parallel.

The electrolytic solution may be constituted as a non-aqueous solvent-type system or an aqueous system.

The non-aqueous solvent-type electrolytic solution may be formed by dissolving an electrolyte in an organic solvent, examples of which include: ethylene carbonate, propylene carbonate, γ-butyrolactone, dimethylsulfoxide, dimethylformamide, acetonitrile, tetrahydrofuran, and dimethoxyethane. These organic solvents may be used singly or in mixture of two or more species. Examples of the electrolyte may include: $(C_2H_5)_4PBF_4$, $(C_3H_7)_4PBF_4$, $(C_2H_5)_4NBF_4$, $(C_3H_7)_4NBF_4$, $(C_2H_5)_4PPF_6$, $(C_2H_5)_4PCF_3SO_3$, $LiBF_4$, $LiClO_4$ and $LiCF_3SO_3$.

Examples of the aqueous electrolytic solution may include: NaCl, NaOH, HCl and $H_2SO_4$.

EXAMPLES

Hereinbelow, the present invention will be described more specifically based on Examples and Comparative Examples.

Incidentally, the values of average layer-plane spacing ($d_{002}$) and specific surface area measured according to the nitrogen adsorption BET method described herein including the following Examples are based on values measured in the following manner.

[Average layer-plane spacing ($d_{002}$) of carbonaceous material]

A powdery sample of a carbonaceous material was packed in an aluminum-made sample cell and irradiated with monochromatic CuKα rays (wavelength λ=0.15418 nm) through a graphite monochromator to obtain an X-ray diffraction pattern. The peak position of the diffraction pattern is determined by the center of gravity method (i.e., a method wherein the position of a gravity center of diffraction lines is obtained to determine a peak position as a 2θ value corresponding to the gravity center) and calibrated by the diffraction peak of (111) plane of high-purity silicon powder as the standard substance. The $d_{002}$ value is calculated from the Bragg's formula shown below.

$$d_{002}=\lambda/(2\cdot\sin\theta) \qquad \text{(Bragg's formula)}$$

[Specific surface area by the nitrogen adsorption BET method]

An approximate equation $$V_m=1/(V\cdot(1-x))$$

derived from the BET equation was used to obtain $V_m$ (amount (cm$^3$/g-sample) of adsorbed nitrogen required to form a mono-molecular layer of nitrogen on the sample surface) from a measured nitrogen volume V at a relative pressure x (=0.3) according to the BET single-point method using nitrogen adsorption. From the thus-obtained $V_m$-value, a specific surface area SSA was calculated based on the following equation:

$$SSA=4.35\times V_m (m^2/g).$$

More specifically, the nitrogen adsorption onto a carbonaceous material was performed at liquid nitrogen temperature by using "Flow Sorb II 2300" (available from Micromeritics Instrument Corp.) in the following manner.

A sample carbonaceous material pulverized into an average diameter of 5–50 µm was packed in a sample tube, and the sample tube was cooled to −196° C. while flowing helium gas containing nitrogen at a concentration of 30 mol. %, thereby to cause the carbonaceous material to adsorb nitrogen. Then, the sample tube was restored to room temperature to measure the amount of nitrogen desorbed from the sample by a thermal conductivity-type detector, thereby to obtain the adsorbed nitrogen amount V (cm$^3$/g-sample).

Example 1

68 kg of a petroleum pitch having a softening point of 210° C., a quinoline-insoluble content of 1 wt. % and an H/C atomic ratio of 0.63, and 32 kg of naphthalene, were placed in a 300 liter-pressure-resistant vessel equipped with stirring blades, melt-mixed under heating at 190° C. and, after being cooled to 80–90° C., extruded to form a ca. 500 μm dia.-string-shaped product. Then, the string-shaped product was broken so as to provide a diameter-to-length ratio of ca. 1.5, and the broken product was charged into an aqueous solution containing 0.53 wt. % of polyvinyl alcohol (saponification degree=88%) and heated to 93° C., followed by stirring for dispersion and cooling to form a slurry of pitch spheres. After removing a major part of water by filtration, the pitch spheres were subjected to extraction with ca. 6 times by weight of n-hexane to remove the naphthalene in the pitch spheres. The thus-obtained porous spherical pitch was heated to 260° C. in a fluidized bed while passing heated air and held at 260° C. for 1 hour to be oxidized into a thermally-infusible porous spherical oxidized pitch product.

The thus-obtained thermally infusible porous pitch product was subjected to a steam activation treatment in a fluidized bed by heating at a rate of 200° C./hour from 300 to 900° C. and heating (steam activation) at 900° C. for 120 min, respectively in a nitrogen/steam mixture gas containing 50 mol. % of $H_2O$ to obtain a spherical carbonaceous material (activated carbon) having a specific surface area of 1000 $m^2/g$. The spherical carbonaceous material was pulverized to an average particle size of ca. 30 μm to provide a carbonaceous electrode material.

Examples 2–4

Three carbonaceous electrode materials were prepared in the same manner as in Example 1 except that the steam activation time at 900° C. was changed to 140 min. (Example 2), 200 min. (Example 3) and 240 min. (Example 4), respectively.

Comparative Examples 1 and 2

Two carbonaceous electrode materials were prepared in the same manner as in Example 1 except that the steam activation time at 900° C. was changed to 60 min. (Comparative Example 1) and 270 min. (Comparative Example 2), respectively.

Comparative Example 3

A high-specific surface area activated carbon ("30SPD", mfd. by Kansai Netsukagaku K.K.) prepared by subjecting to coal coke to alkali activation was used as a carbonaceous electrode material.

Comparative Example 4

An activated carbon ("BP-12", mfd. by Kanebo K.K.) prepared from phenolic resin was used as a carbonaceous electrode material.

Comparative Example 5

An activated carbon ("BP-25", mfd. by Kanebo K.K.) prepared from phenolic resin was used as a carbonaceous electrode material.

[Preparation and Evaluation of Capacitors]

Each carbonaceous material prepared in the above Examples and Comparative Examples was used to prepare an electric double layer capacitor, of which the performance was evaluated in the following manner.

Electrodes were prepared as follows. Each carbonaceous material in an average particle size of ca. 30 μm was kneaded with polytetrafluoroethylene powder in 10 wt. % and furnace black (average primary particle size of ca. 42 nm) in 9 wt. %, respectively based on the carbonaceous material, at room temperature, and the kneaded product was compression-molded to form a 20 mm-dia. disk-form polarizable electrode having a weight of 100 mg. The electrode was dried at 150° C. for 4 hours under a reduced pressure of 1–3 kPa in a vacuum desiccator. Then, in a vacuum substitution-type glove box wherein a high-purity argon having a dew point of −100° C. was circulated, a pair of the above-prepared polarizable electrodes as a positive electrode 1 and a negative electrode 2 were disposed to sandwich a 1 mm-thick glass filter 3 to form a laminate, as shown in the sole figure in the drawing. The laminate was then immersed in an electrolytic solution 5 held within an aluminum-made vessel 4 including a bottom 4a functioning as a negative electrode substrate so that the positive electrode 1 was disposed at an upper position, and a positive electrode 8 affixed to a lower surface of an upper lid 8 via a spring 7 was pressed at a pressure of ca. 400 kPa against the positive electrode 1 of the laminate to form a test cell as shown in the figure. The upper lid 6 functioning as a positive electrode terminal and the vessel 4 functions as a negative electrode terminal were insulated from each other by an O-ring 9 of a fluoro-elastomer ("Viton" available from Du Pont). The electrolytic solution comprised a solution of $(C_2H_5)_4 \cdot NBF_4$ at a concentration of 1 mol/liter in a propylene carbonate. The separator 3 comprised glass fiber filter ("GA100", available from ADVANTEC).

The test cell was subjected to a charge/discharge test by using a charge/discharge test apparatus ("HD201", available from Hokuto Denko K.K.) wherein the cell was charged at a constant current of 5 mA up to a potential of 2.3 volts and then charged at the constant voltage for a total charging period of 2 hours, and then the cell was discharged at a constant current of 5 mA down to a terminal voltage of 0 volt.

The capacitance of each test cell was determined by first obtaining a total discharged energy as a time-integrated value of discharge energy (=discharge voltage×current (=5 mA)) from a discharge curve (i.e., a graph of discharge voltage vs. discharge time) and by using an equation of capacitance (F)=2×total discharge energy (W.sec)/(discharge voltage (V))$^2$. The capacitance was divided by the total weight (g) of the carbonaceous material in the polarizable electrodes (positive electrode and negative electrode) to obtain a capacitance per weight (F/g), which was then multiplied by a bulk density (g/cm$^3$) of the polarizable electrodes 1 and 2 to obtain a capacitance per unit volume (F/cm$^3$).

The resistance was obtained by first drawing a tangential line on the discharge curve (discharge voltage vs. discharge time) at a point of 5 min. after the start of the discharge and extrapolating the tangential line to obtain a potential at the time of discharge start (0 min.). The potential obtained by the extrapolation was subtracted from the discharge initiation voltage of 2.3 volts to determine a voltage drop at the time of the discharge start. Then, the resistance value was obtained by dividing the voltage drop by the discharge current.

The properties of the carbonaceous materials of Examples and Comparative Examples and the performances of electric double layer capacitors obtained therefrom are inclusively shown in Table 1 below.

As is understood from Table 1, electric double layer capacitors having a large capacitance per unit volume and a small resistance could be obtained by using carbonaceous materials according to the present invention.

TABLE 1

| Example & Comp. Ex. | | Starting material | Carbonaceous material | | Capacitor Electrode | | | |
|---|---|---|---|---|---|---|---|---|
| | | | SSA (m²/g) | $d_{002}$ (nm) | density (g/cm³) | Capacitance F/g | F/cm³ | Resistance (ohm.) |
| Example | 1 | Petroleum pitch | 1000 | 0.352 | 0.76 | 23.1 | 17.6 | 9.8 |
| | 2 | -ditto- | 1200 | 0.348 | 0.78 | 23.7 | 18.5 | 1.0 |
| | 3 | -ditto- | 1500 | 0.342 | 0.64 | 25.2 | 16.1 | 1.5 |
| | 4 | -ditto- | 1730 | 0.338 | 0.54 | 26.5 | 14.3 | 1.8 |
| Comp. Ex. | 1 | Petroleum pitch | 700 | 0.360 | 1.00 | 9.9 | 9.9 | 69.0 |
| | 2 | -ditto- | 2120 | 0.337 | 0.45 | 28.0 | 12.6 | 2.4 |
| | 3 | Coal coke | 3400 | 0.337 | 0.43 | 36.0 | 15.5 | 9.2 |
| | 4 | Phenolic resin | 1200 | 0.362 | 0.77 | 25.0 | 19.3 | 28.5 |
| | 5 | Phenolic resin | 2800 | 0.338 | 0.44 | 29.9 | 13.2 | 2.44 |

What is claimed is:

1. A carbonaceous material for electric double layer capacitors, having a specific surface area of 800–2000 m²/g as measured by the nitrogen adsorption BET method, and an average layer-plane spacing of at most 0.36 nm as measured by the X-ray diffraction method, said carbonaceous material being in the form of powder having an average particle size of 5–100 μm.

2. The carbonaceous material according to claim 1, wherein the carbonaceous material is in a state of activated carbon formed by carbonization and activation of pitch.

3. A process for producing a carbonaceous material for electric double layer capacitors, comprising: activating a carbon precursor of pitch origin in an oxidizing gas atmosphere at a temperature of 700–1500° C. to provide a carbonaceous material having a specific surface area of 800–2000 m²/g as measured by the nitrogen adsorption BET method, and an average layer-plane spacing of at most 0.36 nm as measured by the X-ray diffraction method, said carbonaceous material being in the form of powder having an average particle size of 5 to 100 μm.

4. The process according to claim 3, wherein the carbon precursor of pitch origin has been produced through steps of:

mixing pitch with an additive comprising an aromatic compound having two or three aromatic rings and a boiling point of at least 200° C. to form a shaped pitch product, extracting the additive from the shaped pitch product with a solvent showing a lower dissolving power to the pitch and a higher dissolving power to the additive, thereby to leave a porous pitch product, and oxidizing the porous pitch product to form a thermally infusible porous carbon precursor to be subjected to the activation.

* * * * *